April 9, 1935.  J. C. STEWART  1,997,088
SOUND GATE
Filed March 5, 1931

INVENTOR
J. G. STEWART
BY
ATTORNEY

Patented Apr. 9, 1935

1,997,088

UNITED STATES PATENT OFFICE 1,997,088

SOUND GATE

James G. Stewart, Los Angeles, Calif., assignor to Radio Corporation of America, a corporation of Delaware Application March 5, 1931, Serial No. 520,289

27 Claims. (Cl. 179—100.3)

In a talking motion picture projector, the film is moved in an intermittent manner past a picture gate, and in a continuous manner past a sound gate. At the former point the image of the film, during the period when it is stationary, is focused upon the screen to produce the optical effect of the talking motion picture and at the sound gate the moving image of the sound portion of the combined talking motion picture film is thrown upon and used to vary the electrical characteristics of a photoelectric device. Such variations cause, by means of suitable amplification apparatus, the operation of the loudspeakers and produce the sound effect of the talking motion picture.

The present invention relates to a sound gate construction for a talking motion picture projector. The gate of my invention may be arranged to be added to the existing motion picture projector in the form of an adapter, or the gate may be incorporated in the usual talking motion picture projector.

It is the object of my invention to produce an improved sound motion picture projector.

It is a further object of my invention to produce an improved sound gate for a talking motion picture projector or for a sound reproducing adapter for a motion picture projector.

A still further object of my invention is to produce a sound gate which will serve to accurately position the film during reproduction of the sound portions thereof.

A yet further object of my invention is to produce a sound gate which will hold the film under an even tension and yet permit it to move freely past the sound reproducing point.

Another object of my invention is to produce an apparatus which will place the film at the sound reproducing point under an even tension, yet permit its free motion thereby and at the same time accurately positioning the film at said point.

These and other objects of my invention will become apparent from the following specification taken in connection with the appended drawing.

In accomplishing the objects of my invention, I provide a single spring member comprising two leaves adapted to press upon the opposite sides of the film as it moves past the sound reproducing point. I provide a film shoe in the form of an arc against which shoe it is pressed by the two leaves of the spring. The spring is carried in a removable gate member which is spring pressed against the shoe member. Small spacing pins are provided, however, in the gate member which rest against the shoe member and the tension upon the film is solely that exerted by the leaves of the sound gate shoe spring.

Having thus briefly described my invention, attention is now invited to the accompanying drawing in which.

Figure 2:
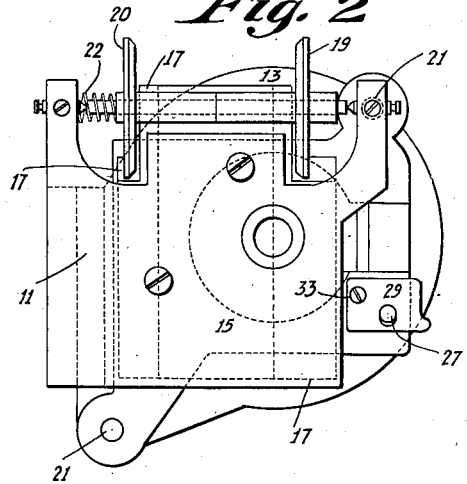
Fig. 2 is a front view of my gate with the gate member removed.

Attention is now particularly invited to the drawing in which like reference numerals represent like parts. The frame member 11 includes a flange portion 13 at one end thereof, as shown more particularly in Fig. 3, and at the other end, a flange 15 (Fig. 2) adapted to carry the gate shoe 17, attached thereto in any suitable manner, and a film roller 19—20. The film roller comprises two portions which are spring pressed toward each other. The portion of the roller 19 toward the side of the film bearing the sound strip is accurately positioned and is secured to the roller shaft which latter is pivoted for free rotation, as shown more particularly in Fig. 2. The other portion 20 of the roller is spring pressed toward the portion 19 by means of the spring 22 which surrounds the roller shaft. The film roller shaft is pivoted in the portion 15 of the frame 11 in any suitable manner, the details of which are clearly shown in Fig. 2 but constitute no part of the present invention.

Figure 4:
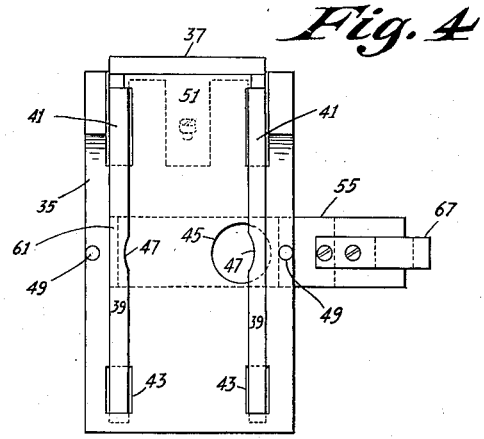
Fig. 4 is a front view of the removable sound gate member.

The portion 13 of the frame 11 has mounted thereon two pins 21—21, suitably mounted upon which is the film gate member carrier 23. This carrier is spring pressed by means of springs 25 surrounding the pins 21. In order to maintain the gate in the open position there is provided a pin 27 likewise mounted in the member 13, said pin having an annular recess 31 near the end thereof in which a latch member 29 is adapted to fall when the gate is in the open position. This serves to retain the gate open against the pressure of the springs 25. The removable gate member 35 has an arcuate surface corresponding in curvature to the arcuate surface of the shoe member 17. Slots 41—41 and 43—43 are cut through the projecting portions of the two ends of the member 35 respectively, and are adapted to accommodate the leaves 39 of the spring 37 which latter is mounted by means of a projection 51 on a surface 53 recessed in the back of the member 35, as shown more particularly in Fig. 1. The leaves 39 bear upon the bottom of the recess 41—41 but are positioned freely with respect to the recess 43 as shown more particularly in Fig. 4. Through the gate member 35 is provided a hole 45 through which the reproducing light is permitted to pass to or from the sound portion of the film passing the film gate. Each of the leaves 39—39 of the spring 37 has a cutaway portion 47 on its inside in order to permit a reversing of the spring and yet prevent interference with the sound record at the reproducing point.

When the gate is closed, the pressure of the springs 25 against the gate carrier member 23 forces the gate member toward the shoe 17 until the ends of the studs 49—49 carried by the gate member 35 bear against the surface of the shoe member 17. The film, however, is not of sufficient width to be in any way affected by this pressure. In other words, the film passes between the studs 49—49 and is pressed by means of the spring leaves 39 against the arcuate surface of shoe 17.

Figure 3:
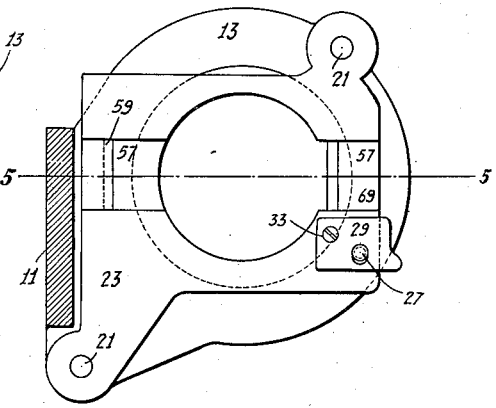
Fig. 3 is a cross section of my sound gate taken on the line 3—3 of Fig. 1.
Figure 5:
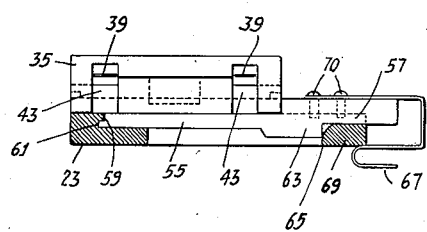
Fig. 5 is a view of the removable gate member looking from the bottom thereof, as shown in Fig. 4. This view also shows the method of gate member upon the gate member carrier.

As before noted the gate member 35 is removably mounted to permit adjustment of the spring 37 or replacement thereof as may be desired. In accomplishing this, there is attached to the gate member at the rear thereof a member 55. At one end of the member 55 is provided a projection 61 which fits into a recess under the tongue 59 left in the carrier member 23 when the portion 57 is cut away. The member 55 is provided with a lug portion 63 which bears against the surface 65 of the cutaway portion 57 of carrier 23. Thus when the member 55 is pressed against the surface of 69, as shown in Figs. 3 and 5, the pressure of 63 against 65 locks the projection 61 under the projection 59. The gate member is maintained in this position by means of the spring 67 secured to the member 55 by means of screws 66. This spring partially surrounds the reduced portion 69 of carrier 23.

Figure 1:
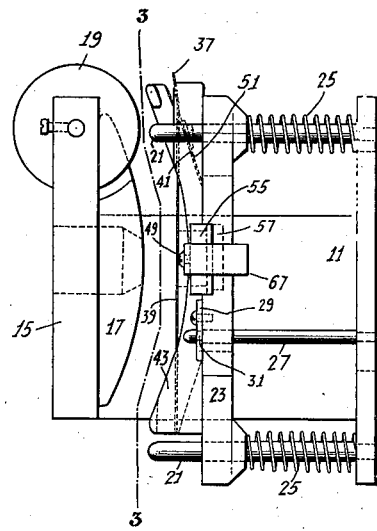
Fig. 1 is a general side view of my improved sound gate.

In the operation of my invention, the gate member is placed on the carrier member while the latter is in the position shown in Fig. 1, that is, in the open position. The film is passed through the gate roughly in the position shown by the section line 3—3, and the latch 29 is released permitting the carrier member 23 to move to the running position. This forces the studs 49—49 of the gate member 35 against the surface of shoe member 17 and the film between the surfaces of the roller 19. It is to be noted that the position of the film is governed by the rollers 19 as the gate moves into the running position. Thus the film is laterally positioned before the spring leaves 39 bear on it. As the gate is completely closed, the leaves 39 press the film against the curved surface of the shoe 17.

It can be seen thus that there is exerted upon the film a light, even pressure which will serve to keep the film at all times pressed against the curved surface of shoe 17 and thus in exact focus relative to the sound reproducing optical system. The roller 19—20 serves to accurately position the film laterally as above described in order that the illumination may be arranged to be confined to the sound portion of the film.

Any appropriate means may be provided for mounting the gate apparatus with the projector, the specific details of which mounting constitute no part of the present invention.

Having thus described my invention, it is to be understood that various changes may be made therein, and that I am therefore not to be limited to the specific embodiment shown and described for the purpose of illustration only, but by the actual scope of my invention as set forth in the appended claims.

I claim:

1. A sound gate comprising a frame member, a shoe member carried by said frame member, having a curved surface over which a film is adapted to pass, a roller member for cooperation with the film also carried thereby, said roller comprising one portion laterally fixed and a second spring pressed portion adapted to press the film passing through said roller against the fixed portion thereof to accurately position said film laterally, a spring pressed gate carrier member, a gate member carried by said carrier member and having a curved surface adapted to cooperate with the curved surface of said shoe member, positioning studs disposed on said gate member to bear against the surface of said shoe member and thus accurately position said gate member relative thereto, a spring member carried by said gate member, said spring member comprising two leaves for bearing upon the marginal portions of the film and pressing it into contact with said shoe, cutaway portions on the inner sides of each of said leaves, and a removable mounting for said gate member whereby it is mounted upon said gate carrier member.

2. A sound gate comprising a frame member, a shoe member carried by said frame member, having a curved surface over which a film is adapted to pass, a roller member for cooperation with the film also carried thereby, said roller comprising one portion laterally fixed and a second spring pressed portion adapted to press the film passing through said roller against said fixed portion thereof to accurately position said film laterally, a spring pressed gate carrier member, movable to operating and threading positions, means for retaining said member in the threading position, a gate member carried by said carrier member and having a curved surface adapted to cooperate with the curved surface of said member, positioning studs disposed on said gate member to bear against the surface of said shoe member and thus accurately position said gate member relative thereto, a spring member carried by said gate member, said spring member comprising two leaves for bearing upon the marginal portions of the film and pressing it into contact with said shoe, cutaway portions of each side of said leaves and a removable mounting for said gate member whereby it is mounted upon said gate carrier member.

3. A sound gate comprising a frame member, a shoe member carried by said frame member and having a curved surface over which a film is adapted to pass, a roller member for cooperation with the film and also carried thereby, said roller comprising one portion laterally fixed and a second spring pressed portion adapted to press the film passing through said roller against said fixed portion thereof to accurately position said film laterally, a spring pressed carrier member, a removably mounted gate member carried by said carrier member, positioning studs disposed in the surface of said gate member to bear against the surface of said shoe member and thus accurately position said gate member relative thereto, and a spring member carried by said gate member for pressing the film into contact with said shoe.

4. A sound gate comprising a frame member, a shoe member carried by said frame member and having a curved surface over which a film is adapted to pass, a roller member for cooperation with the film also carried thereby, said roller comprising two portions one portion of which is laterally fixed and the second of which is spring pressed and adapted to press the film passing through said roller against said fixed portion thereof to accurately position said film laterally, a spring pressed carrier member movable to operating and threading positions, means for retaining said member in threading position, a removably mounted gate member carried by said carrier member, positioning studs disposed in the face of said gate member to bear against the surface of said shoe member, and thus accurately position said gate member relative thereto, and a spring member carried by said gate member for pressing the film into contact with said shoe.

5. A sound gate comprising a frame member, a shoe member carried by said frame member and having a curved surface over which a film is adapted to pass, a roller member for cooperation with the film carried thereby, said roller comprising one portion laterally fixed and a second spring pressed portion adapted to press the portion passing through said roller against said fixed portion thereof to accurately position said film laterally, a spring pressed carrier member movable to operating and threading positions, means for retaining said member in the threading position, a removably mounted gate member carried by said carrier member, positioning studs disposed in the surface of said gate member to bear against the surface of said shoe member and thus accurately position said gate member relative thereto, and a spring member carried by said gate member, said spring member comprising two leaves for bearing upon the marginal portions of the film and pressing it into contact with said shoe.

6. A sound gate comprising a frame member, a shoe member carried by said frame member and having a curved surface over which a film is adapted to pass, a roller member for cooperation with the film carried thereby, said roller comprising one portion laterally fixed and a second spring pressed portion adapted to press the portion passing through said roller against said fixed portion thereof to accurately position said film laterally, a removably mounted gate member carried by said carrier member, positioning studs disposed in the surface of said gate member to bear against the surface of said shoe member and thus accurately position said gate member relative thereto, and a spring carried by said gate member, and said spring comprising two leaves for bearing upon the marginal portions of the film and pressing it into contact with said shoe.

7. A sound gate comprising a frame member, a shoe member carried by said frame member and having a curved surface over which a film is adapted to pass, a spring pressed carrier member movable to operating and threading positions, means for retaining said carrier member in the threading position, a removably mounted gate member carried by said carrier member, positioning studs disposed in the surface of said gate member to bear against the surface of said shoe member and thus accurately position said gate member relative thereto, and a spring member carried by said gate member for pressing the film into contact with said shoe.

8. A sound gate comprising a frame member, a shoe member carried by said frame member and having a curved surface over which a film is adapted to pass, a spring pressed carrier member, a removably mounted gate member carried by said carrier member, positioning studs disposed in the surface of said gate member to bear against the surface of said shoe member and thus accurately position said gate member relative thereto, and a spring member carried by said gate member and comprising two leaves for bearing upon the marginal portions of the film and pressing it into contact with said shoe.

9. A sound gate comprising a frame member, a shoe member carried by said frame member and having a curved surface over which a film is adapted to pass, a spring pressed carrier member movable to operating and threading positions, means for retaining said carrier member in the threading position, a removably mounted gate member carried by said carrier member, and a spring member carried by said gate member comprising a plurality of leaves for bearing upon the marginal portions of the film and pressing it into contact with said shoe.

10. A sound gate comprising a frame member, a shoe member carried by said frame member and having a curved surface over which a film is adapted to pass, a spring pressed carrier member movable to operating and threading positions, means for retaining said carrier member in the threading position, a removably mounted gate member carried by said carrier member, and a spring member carried by said gate member for pressing the film into contact with said shoe.

11. A sound gate comprising a frame member, a shoe member having a curved surface at the sound translation point over which a film is adapted to pass, said member being carried by said frame member, a spring pressed carrier member, a removably mounted gate member carried by said carrier member, and a flexible spring member carried by said gate member for pressing the film into contact with the curved surface of said shoe.

12. A sound gate comprising a frame member, a shoe member over which a film is adapted to pass, said shoe member being carried by said frame member, a spring pressed carrier member, a removably mounted gate member carried by said carrier member, and a flexible member carried by said gate member and arranged to engage said film for pressing it into contact with said shoe.

13. A sound gate comprising a frame member carrying a shoe member having a surface over which a film is adapted to pass, a spring pressed carrier member, a removably mounted gate member carried by said carrier member, means for limiting the motion of said gate member toward said shoe member, and a light flexible spring member carried by said gate member and arranged to engage said film for pressing it into contact with said shoe.

14. A sound gate comprising a frame member, a shoe member carried by said frame member, and having a surface over which a film is adapted to pass, a spring pressed gate member, means for limiting the motion of said gate member toward said shoe member, and a flat spring carried by said gate member adapted to engage said film and press it into contact with said shoe.

15. A sound gate comprising a shoe member having a surface over which a film is adapted to pass, a spring pressed gate member adapted to press toward said shoe member, means for limiting the motion of said gate member toward said shoe member, and a light leaf spring member adapted to engage said film and press it into contact with said shoe member.

16. A sound gate comprising a shoe member having a curved surface over which a film is adapted to pass at the sound translation point, a spring pressed gate member opposed to said shoe member, means for limiting the motion of said gate member toward said shoe member, and a plurality of light flat spring members engaging the film for positioning the film accurately as it passes between said gate member and said shoe.

17. A sound gate comprising a curved shoe member over which the film being reproduced is adapted to be passed, a spring pressed gate member movable to operating and threading positions, means for retaining said gate member in the threading position, means for limiting the motion of said gate member toward said shoe member, and a flexible member adapted to engage said film and press it against said shoe member.

18. A sound gate comprising a shoe member having a surface over which the film being reproduced is adapted to pass, a spring pressed carrier member, a removably mounted gate member carried by said carrier member, means for limiting the motion of said gate member toward said shoe, and a flexible member for engaging said film and pressing it into contact with said shoe.

19. A sound gate comprising a curved shoe member having a curved surface over which the film being reproduced is adapted to pass at the sound translation point, a spring pressed gate adapted to cooperate with said shoe member, and means carried by the gate and contacting with said shoe for limiting the motion of said gate member toward said shoe.

20. A sound gate comprising a shoe member over which the film being reproduced is adapted to pass, a gate member adapted to cooperate with said shoe member, and a flexible member carried by said gate member for engaging said film and pressing it into contact with said shoe.

21. A sound gate comprising a curved film shoe member provided with an aperture, a gate member arranged to cooperate with said shoe member, and a flexible member supported by said gate member and arranged to press the film into contact with said shoe at said aperture with a pressure which is greatest at the sound translating point and decreases in opposite directions therefrom.

22. A sound gate comprising a curved film shoe member provided with an aperture, a gate member arranged to cooperate with said shoe member, a flexible member supported by said gate member and arranged to press the film into contact with said shoe at said aperture with a pressure which is greatest at the point of sound translation, and resilient means for biasing said gate member toward said shoe member.

23. A sound gate comprising a curved film shoe member provided with an aperture, a gate member arranged to cooperate with said shoe member, a flexible member supported by said gate member and arranged to press the film into contact with said shoe at said aperture with a pressure which is greatest at the point of sound translation, resilient means for biasing said gate member toward said shoe member, and means for limiting the movement of said gate member toward said shoe member.

24. A film gate comprising a curved stationary member and means for holding a film thereagainst comprising a flat spring member of an inverted U shape, and means for supporting said spring member adjacent its ends only.

25. A film gate comprising a curved stationary member and a movable member holding a film thereagainst comprising a flat spring member of an inverted U shape, and a movable member supporting said spring member adjacent its ends only.

26. A film gate comprising a curved stationary member and a spring-pressed movable member holding a film thereagainst comprising a flat spring member of an inverted U shape, and a spring-pressed movable member supporting said spring member adjacent its ends only.

27. A film gate comprising a curved stationary member, a flat spring member for holding the film against said stationary member, and means urging said flat spring member toward said stationary member at points beyond the area of contact between said spring member and said film.

JAMES G. STEWART.